Figure 1:
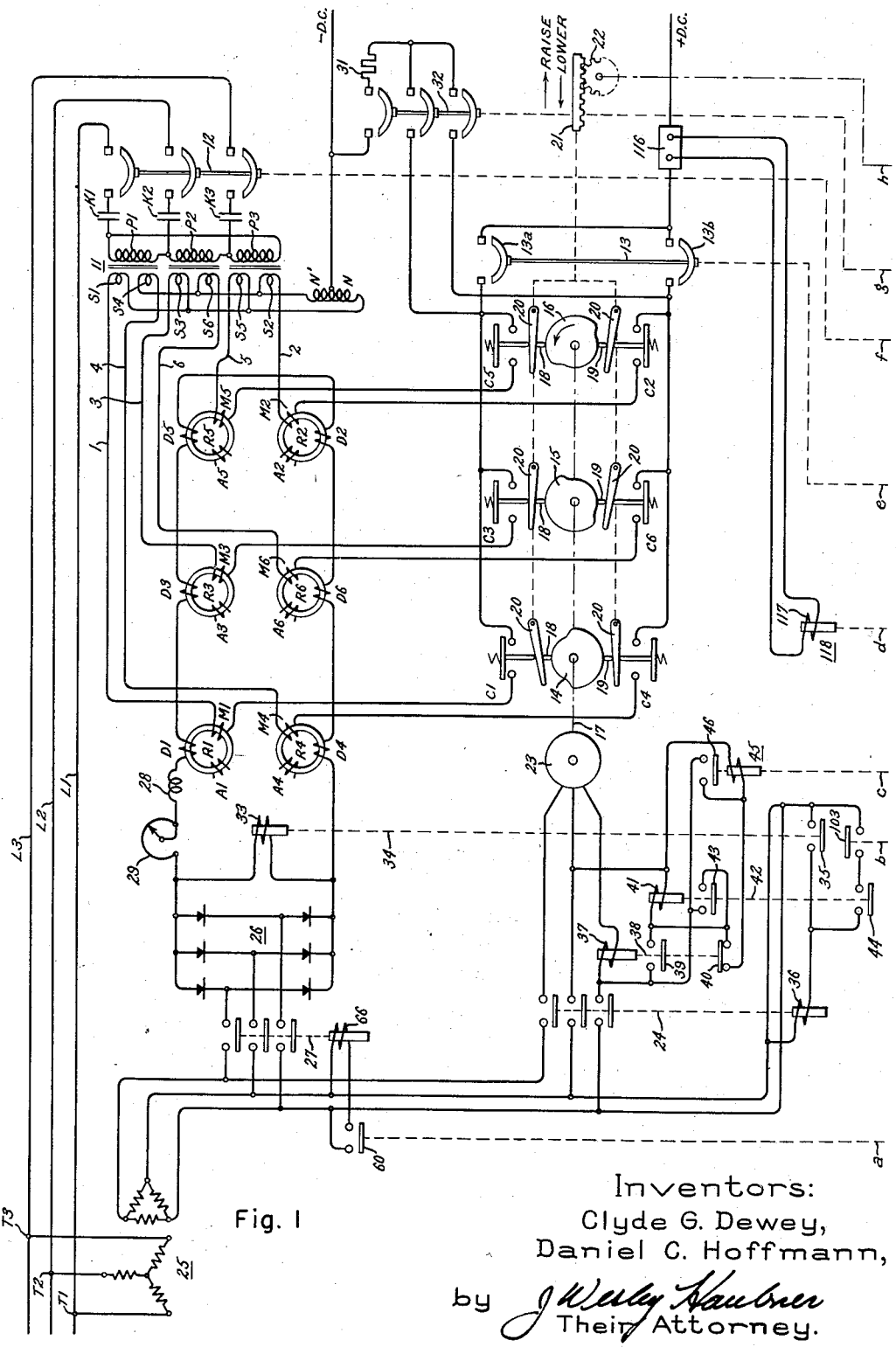

Inventors:
Clyde G. Dewey,
Daniel C. Hoffmann,
by J Wesley Haubner
Their Attorney.

Inventors:
Clyde G. Dewey,
Daniel C. Hoffmann,
by J Wesley Haubner
Their Attorney.

United States Patent Office 2,864,051
Patented Dec. 9, 1958

2,864,051

CONTROL SYSTEM FOR STARTING ELECTRIC CURRENT RECTIFYING APPARATUS

Daniel C. Hoffmann and Clyde G. Dewey, Lansdowne, Pa., assignors to General Electric Company, a corporation of New York Application December 28, 1955, Serial No. 555,821

9 Claims. (Cl. 321—48)

This invention relates to control systems for starting electric current rectifying apparatus and more particularly to control system for starting synchronous switching apparatus comprising circuit opening and closing switch contacts which operate cyclically in overlapping sequence to supply rectified alternating current to a direct current load circuit.

Apparatus which employs a plurality of cyclically operable circuit opening and closing switch contacts arranged to conduct direct current from successive phases of a source of polyphase alternating current to a direct current load circuit is known as a mechanical rectifier. When supplied by 60 cycles per second alternating electric power, the contacts of a mechanical rectifier must complete over five million opening and closing cycles a day. Contact life and contact maintenance requirements therefore become extremely important factors in successful operation of equipment of this type. The contacts must be protected at all times from the deleterious effects of electric sparking. Toward this end, saturable commutating reactors have been used in a manner, such as described and claimed in U. S. Patent No. 2,284,794, issued to Burnice D. Bedford on June 2, 1942, to establish in each outgoing phase circuit under normal operating conditions a period of substantially zero contact current and voltage after commutation, i. e., after the transfer of load current through overlapping contacts from the outgoing to an incoming phase circuit. During this period of limited current and voltage, which period is obtained by desaturating the reactor, the contact associated with the outgoing phase of alternating current can be safely opened without electric sparking. The reactors ordinarily have suitable control windings and circuits arranged to provide biasing M. M. F. for controlling the desaturation of the reactors in cooperation with the magnetization produced by the phase circuit current during normal operating conditions. But this arrangement can not be relied upon for properly limiting contact current and voltage while the mechanical rectifier is being started from rest, since during the starting process abnormal current and voltage transients or phase disturbances may occur with resulting destructive contact sparking.

Accordingly, it is an object of this invention to provide a control system for starting a mechanical rectifier whereby the operations of certain rectifier components are initiated in a specific sequence required to prevent contact sparking.

Another object of the invention is to provide a control system for progressively energizing and placing into operation the components of a mechanical rectifier so as substantially to eliminate contact sparking or other transient current and voltage disturbances that might result in an arc back.

It is another object of this invention to provide a control system for operating the components of a mechanical rectifier in the proper sequence for either starting or stopping the rectifier safely and without contact sparking.

The control system of the present invention is particularly suitable for starting operation of mechanical rectifiers provided with the improved type of contact operating mechanism which permits adjustment of contact dwell, i. e., adjustment of the period in its operating cycle during which a contact remains closed, as described and claimed in U. S. Patent No. 2,713,095 issued to H. P. Fullerton on July 12, 1955. The control system is similarly suitable for use with a mechanical rectifier having the commutating reactor control winding circuits and the contact shunting arrangement described and claimed in U. S. Patent No. 2,834,932 issued to C. G. Dewey on May 13, 1958.

In carrying out our invention in one form, a supply circuit in which a switch contact cyclically operates to rectify current is coupled to a direct current load circuit by main switching means. Auxiliary switching means is used to connect a predetermined light load impedance to the supply circuit. The supply circuit is coupled to a source of alternating current by a circuit interrupter which can be closed only while the contact dwell is zero. A manually controlled starting switch is provided to supply energization to the commutating reactor control circuits, whereupon a synchronous motor which actuates the contact operating mechanism is coupled for energization to the source of alternating current. Relay means is actuated in response to synchronous operation of the motor. Actuating means operates in response to the actuation of the relay means when the circuit interrupter is closed and both of said switching means are open to actuate the contact dwell adjusting means to increase contact dwell from zero to normal. The auxiliary switching means will close upon the contact dwell attaining its normal operating relation. The main switching means can now be closed. A current responsive relay is energized by the flow of rectified current in the load circuit, and the auxiliary switching means is opened in response to the energization of this relay.

A manually controlled stopping switch is also provided, and when operated to its stopping position, the auxiliary switching means is closed whereupon the main switching means will be opened. The auxiliary switching means is again opened in response to the opening of the main switching means, and the actuating means will now operate to change the contact dwell from normal to zero. Upon the dwell reaching zero, the starting switch is operated to its off position, and subsequently the stopping switch is operated to its normal position.

Figure 2:
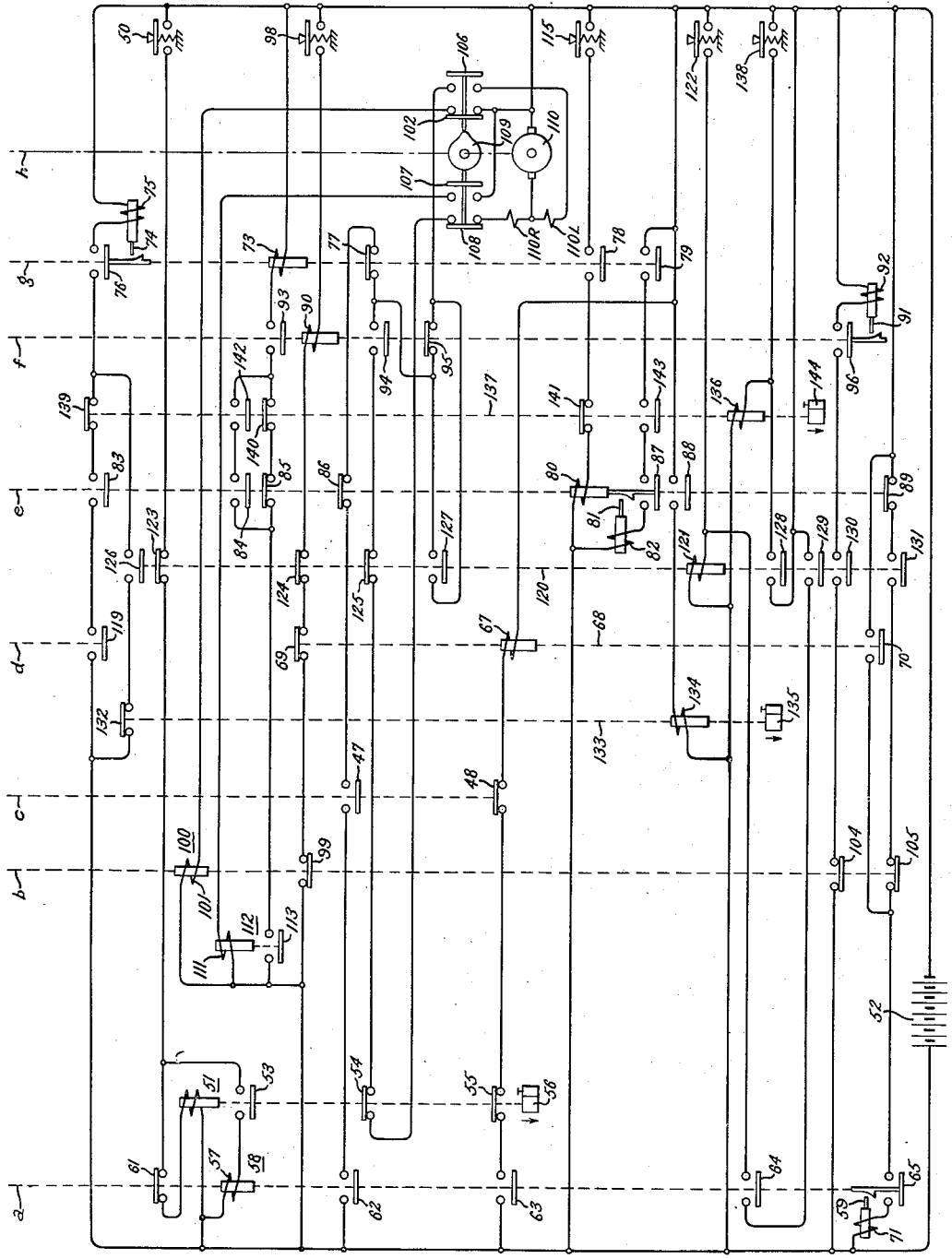

Our invention will be better understood and further objects and advantages will be apparent from the following description taken in conjunction with the accompanying drawings in which Figs. 1 and 2 together form a diagrammatical representation of a mechanical rectifier provided with a control system for starting in accordance with a preferred embodiment of the invention.

Essential components of a single-way mechanical rectifier are illustrated in Fig. 1. The mechanical rectifier is supplied with electric power by a suitable source of 3-phase alternating voltage and current, not shown. Such a source is connected to input terminals T1, T2 and T3 of three supply lines L1, L2 and L3 respectively. Supply lines L1–L3 are connected to a power transformer 11 by suitable circuit interrupting means such as the illustrated 3-pole circuit breaker 12. (The closing and tripping mechanisms of circuit breaker 12 have been shown in Fig. 2.) In the illustrated embodiment of the invention, power transformer 11 is provided with delta-double-Y-connected windings to derive 6-phase alternating voltage of suitable amplitude from the 3-phase supply power. As can be seen in Fig. 1, delta-connected primary windings P1, P2 and P3 of transformer 11 are connected to circuit breaker 12 through capacitors K1, K2 and K3 respectively. These capacitors function to produce commutating voltage in accordance with the invention of A. Schmidt, Jr., as described and claimed in a copending patent application S. N. 343,736, filed on March 20, 1953, and assigned to the present assignee.

Secondary windings S1, S3 and S5 of the transformer 11 supply phase circuits 1, 3 and 5 respectively and have a common neutral point N. Secondary windings S2, S4 and S6 supply phase circuits 2, 4 and 6 respectively and have a common neutral point N'. Phase circuits 1–6 are connected through main windings M1–M6 of suitable saturable commutating reactors R1–R6, respectively, to circuit opening and closing switch contacts C1–C6 respectively. Contacts C1, C3 and C5 are connected to a positive D. C. lead through pole 13a of a main switching means 13, which has been shown as a 2-pole circuit breaker. Contacts C2, C4 and C6 are connected through pole 13b of the main switching means 13 to the same positive D. C. lead. (The closing and tripping mechanisms for the illustrated main switching means 13 have been shown in Fig. 2.) An interphase transformer IT interconnects neutral points N and N', and this transformer is tapped at its center by a negative D. C. lead as indicated in Fig. 1. The positive and negative D. C. leads are connected to a load circuit, not shown, which is supplied with direct current and voltage by virtue of the rectifying action of the contacts C1–C6. Although a single-way mechanical rectifier has been shown in Fig. 1 and will be described for the sake of illustration, the present invention can also be employed in conjunction with a double-way mechanical rectifier having only three phase circuits.

As can be seen in Fig. 1, switch contacts C1–C6 are cyclically operated by a mechanism comprising three similar cams 14, 15 and 16 which are disposed at angular intervals of 120 degrees on a common rotatable shaft 17. Each cam actuates two contacts by means of a pair of oppositely disposed push rods 18 and 19 which have adjustable lengths. The dwell of each contact can be changed by effectively adjusting the length of each push rod, and to accomplish this adjustment in the illustrated embodiment of the invention, six wedges 20 are disposed as shown schematically in Fig. 1 for movement in unison upon actuation of rack and pinion mechanism 21 and 22. When pinion 22 is actuated for rotary movement, rack 21 must slide in a manner to raise or lower the wedges 20. The wedges are lowered by inserting them into the push rods thereby effectively increasing the length of the push rods and decreasing contact dwell, whereas movement out of the push rods raises the wedges and increases contact dwell. When fully lowered, as depicted in Fig. 1, contact dwell is zero and the phase circuits 1–6 will remain open at all times during the operating cycles of the contacts. (The means for actuating pinion 22 has been shown in Fig. 2.) The contact operating mechanism including the means for adjusting contact dwell may be constructed, for example, in accordance with the Fullerton Patent 2,713,095 previously referred to.

To actuate the contact operating mechanism, a 3-phase synchronous motor 23 is coupled to shaft 17. The armature circuit of this motor is connected by switching means comprising a contactor 24 to delta-connected secondary windings of a control power transformer 25 whose Y-connected primary windings are connected to input terminals T1, T2 and T3. Thus, synchronous motor 23 will run at a speed in synchronism with the alternating current and voltage of the electric power source which supplies the current rectifying apparatus comprising switch contacts C1–C6 and associated components. Under normal operating conditions, the dwell of contacts C1–C6 is adjusted so that the contacts associated with successive secondary phases of power transformer 11 are sequentially closed at intervals of 60 degrees, and each phase circuit 1–6 is connected to the positive D. C. lead for a period greater than 120 electrical degrees but less than 180 electrical degrees during each positive half cycle of its voltage. In each set of Y-connected secondary windings, S1, S3 and S5 or S2, S4 and S6, the winding which is positive with respect to the two associated windings is connected to the positive D. C. lead and tends to supply current to the load circuit. The total rectified current supplied to the load in the illustrated embodiment of the invention has twice the magnitude of current furnished by each secondary winding alone.

At each instant of time, two of the six phases of secondary voltage are connected in parallel to the common positive D. C. lead. Therefore, a voltage difference is developed between neutral points N and N', and a voltage appears across interphase transformer IT. By connecting the negative D. C. lead to a center tap of transformer IT, one half of this voltage is subtracted from the voltage across the more positive phase of transformer secondary voltage and one half is added to the voltage across the less positive phase of transformer secondary voltage, and the instantaneous positive-to-negative direct voltage supplied to the load circuit is equal to the average of the two phase voltages.

The switch contacts C1, C3 and C5 associated with the Y-connected set of transformer secondary windings S1, S3 and S5 are cyclically closed and opened in overlapping sequence, and during each overlap period the two windings which are interconnected through their respective closed contacts are effectively short circuited. Similar relationships exist with respect to the Y-connected set of transformer secondary windings S2, S4 and S6. It is during the contact overlap periods that commutation occurs. In other words, while each phase of the trio of alternating voltages is interconnected to the next succeeding phase, current will transfer from the outgoing phase whose positive half cycle of voltage is waning to the succeeding incoming phase whose positive half cycle of voltage is just beginning. The fact that the voltage of the incoming phase circuit has become more positive than the voltage of the outgoing phase circuit causes this transfer of current from the outgoing phase secondary winding to the interconnected incoming phase secondary winding. The commutating reactance of the short circuit, which is determined by the inductance opposing change of current, prevents an instantaneous transfer of current from outgoing to incoming phase circuits.

In order that each incoming phase contact can be closed without sparking prior to commutation and that each outgoing phase contact can be opened without sparking immediately following commutation, the commutating reactors R1–R6 are provided. These reactors preferably are constructed with closed cores made of thinly laminated high-permeability magnetic material, such as 50–50 nickel-iron alloy which has a highly desirable abrupt saturating characteristic. For a given number of turns around its core, the reactor will be just saturated by a magnitude of current which is exceptionally low with respect to the maximum current carrying ability of the reactor. For example, less than 6 amperes may saturate a reactor designed to carry 6000 amperes full load. The permeability of such a reactor when saturated is negligible and when unsaturated is extremely high, approaching infinity. Accordingly, the reactance of each commutating reactor R1–R6 sharply changes from a negligible value to an extremely high value as the reactor comes out of saturation, and in its unsaturated state the reactor is effective to limit to a very low quantity the rate of change of current in its windings.

Each reactor is provided with suitable control means, including a pair of control windings A1–A6 and D1–D6, respectively, as illustrated in Fig. 1, and the control means is arranged to provide under normal operating conditions the proper amount of ampere turns to pre-excite or desaturate the reactor just prior to contact closure and to just desaturate the reactor when the rectified current in the associated main windings M1–M6 has been reduced to practically zero. At the end of commutation, the current in the outgoing phase has decreased from its full load value to practically zero, and at this moment the associated commutating reactor unsaturates and introduces a large reactance into the circuit to prevent further current change while the outgoing phase contact opens without sparking.

Suitable control circuits are provided for the control windings to obtain the above described desaturation control. The control windings A1–A6 are supplied with rectangular-wave alternating bias current from suitable square wave generators, not shown, and control windings D1–D6 are connected in series circuit relation and energized by direct current of appropriate magnitude derived from the control power transformer 25 by a full wave bridge type rectifier 26. Rectifier 26 is coupled to the secondary windings of transformer 25 by a contactor 27. A suitable choke coil 28 and rheostat 29 are provided in the direct current series circuit, as can be seen in Fig. 1. The control circuits thus formed are employed in accordance with the invention described and claimed in the aforesaid Dewey patent application S. N. 524,178. Also in accord with the Dewey application, contact shunting circuits, not shown, can be connected to bypass each contact C1–C6.

The mechanical rectifier described above will operate properly without contact sparking under normal operating conditions. However, there are several problems presented in getting the mechanical rectifier into operation. Since proper rectifier operation requires that the switch contacts be cyclically operated in synchronism with the alternating current supply, the synchronous motor 23 cannot be accelerated from zero to synchronous speed while the mechanical rectifier is connected to the source of alternating current and the contact dwell is normal. If the rectifier were disconnected from the source of alternating current until after the contacts are operating at synchronous speed and with normal dwell, the subsequent closure of interrupting means 12 to connect transformer 11 to the source of alternating current would cause transient voltages which might not be in the proper phase relation with respect to the cyclic operation of the contacts, and a rectifier fault would be very likely to occur.

It has been found that by using a starting procedure which permits the switch contacts to be maintained in an open position, i. e., zero dwell, until the contact operating mechanism has been brought up to speed, and if the contacts are then brought into their normal operating relation with the transformer energized, very little sparking will occur during the time which is needed to get the contacts into normal dwell, provided that this operation is performed with no load on the contacts, and provided further that the two sets of Y-connected transformer secondary windings are not interconnected. The latter requirement is fulfilled by virtue of the double-pole main switching means 13 which separates the trio of phase circuits 1, 3 and 5 from the trio of phase circuits 2, 4 and 6. If switching means 13 were closed while the contact dwell is changing from zero to normal, closed circuits each including interphase transformer IT would be formed and current would flow therein to magnetize transformer IT as soon as the switch contacts began to overlap at 60 degrees dwell. Since the commutating reactor control circuits are phased for normal operating conditions, the commutating reactors could not properly limit this magnetizing current while the contact dwell is changing between 60 degrees and normal, and as a result, contact sparking would occur.

After the switch contacts have been brought into their normal operating relation, it is necessary to electrically connect the three phase circuits 1, 3 and 5 and the three phase circuits 2, 4 and 6. A small amount of sparking may be present after this connection is made if no load is connected to the mechanical rectifier. With no load current, transformer IT magnetizing current would tend to circulate in the phase circuits 1–6, thus flowing in the reverse direction through one of each pair of interconnected phase circuits. As a result, again there would be a lack of proper coordination between bias M. M. F. produced by the reactor control windings and the magnetization produced by current in the main winding M1–M6, and the reactors would be desaturated at the wrong time for preventing contact sparking. This condition is eliminated by the use of a light load resistor 31 having a predetermined value of impedance. The predetermined impedance 31 will cause the flow of a sufficient amount of load current to properly magnetize the interphase transformer IT. Now, current always is conducted in a forward direction by the phase circuits thereby insuring that the commutating reactors R1–R6 will be effective to prevent sparking during contact closure and opening.

The light load resistor 31 is connected between the negative D. C. lead and the switch contacts C1–C6 by means of auxiliary switching means 32. As shown in Fig. 1, this 3-pole switching means also is used to interconnect the trio of switch contacts C1, C3 and C5 with the trio of contacts C2, C4 and C6. (The opening and closing mechanisms for the auxiliary switching means 32 have been shown in Fig. 2.)

The control system of the present invention and the manner in which it operates to obtain the mechanical rectifier starting procedure in accordance with the above set forth requirements will now be described.

As can be seen in Fig. 1, the operating coil 33 of an excitation relay 34 is connected across the bridge type rectifier 26 which supplies energization to commutating reactor control windings D1–D6. Upon energization of these control windings, relay 34 responds by closing its contact 35. Contact 35 connects the operating coil 36 of contactor 24 to the control power supplied by control power transformer 25. When contactor 24 closes in response to its coil 36 being energized, it couples the armature circuit of synchronous motor 23 to the input terminals T1, T2 and T3 which are connected to the source of alternating current.

Connected in one phase of the armature circuit of motor 23 is the operating coil 37 of a current relay 38 having a normally open contact 39 and a normally closed contact 40. Relay 38 is actuated to maintain its contact 39 closed and its contact 40 open only when coil 37 is energized by a predetermined magnitude of current which is less than the inrush value of current supplied to motor 23 but greater than the value of current in the armature circuit when motor 23 is running at synchronous speed. Contact 39 when closed connects the operating coil 41 of a voltage relay 42 to the armature circuit of motor 23. Voltage relay 42 has two normally open contacts 43 and 44, the former contact being connected in parallel with contact 39 of current relay 38. Thus once energized, voltage relay 42 will be retained energized, independent of the closed or open position of current relay contact 39, as long as voltage is supplied to the synchronous motor armature circuit. Voltage relay contact 43 and current relay contact 40 are connected in a manner, as shown in Fig. 1, whereby a control relay 45 is energized whenever both of these contacts are closed. Control relay 45 is actuable when energized to close its contacts 46 and 47 and to open a contact 48. As indicated in Fig. 1, contact 46 when closed will hold control relay 45 energized as long as synchronous motor 23 is supplied with control power. Contacts 47 and 48 are found in Fig. 2 by following broken line c.

The various control system components shown in Fig. 2 will now be described. A manually operable push button switch 50 is used to connect a time element means 51 to a suitable source of substantially constant electric energy such as the illustrated battery 52. Time element means 51 may comprise, for example, the illustrated time delay relay having a normally open contact 53, two normally closed contacts 54 and 55, and a dashpot 56 or the like to delay relay operation only upon deenergization. Thus, time element means 51 picks up substantially instantaneously when energized by the closing of push button switch 50, but when deenergized it does not drop out to its normal position until after a predetermined time interval has elapsed.

When closed, contact 53 of time element means 51 connects the actuating coil 57 of a starting switch 58 to battery 52 through the manually operable push button switch 50. Starting switch 58 is thereby actuated from a normal off position to a starting position wherein it is held by a latch member 59. The starting switch has a normally open contact 60 which, as indicated by broken line a, has been shown in Fig. 1; a normally closed contact 61; and four other normally open contacts 62, 63, 64 and 65. Contact 60 is used to connect the operating coil 66 of contactor 27 to the control power transformer 25 upon actuation of the starting switch, whereby contactor 27 operates to supply energization to the control windings D1–D6 of the commutating reactors R1–R6. As shown in Fig. 2, contact 61 disconnects time element means 51 from battery 52. After the predetermined time interval following this deenergization, the time element means will operate to close its contact 55 which, provided control relay 45 has not actuated to open its contact 48 in the meanwhile, will connect the operating coil 67 of an auxiliary relay 68 to the battery 52 through the presently closed contact 63 of starting switch 58. When energized in this manner, auxiliary relay 68 will open its contact 69 and close its contact 70. Closure of contact 70 connects a solenoid 71 to battery 52 through the presently closed starting switch contact 65, and solenoid 71 responds by releasing latch member 59 in a manner to deactuate starting switch 58 from its starting position to its normal off position.

As indicated in Fig. 2 by following broken line g, the auxiliary switching means 32 of Fig. 1 is provided with a closing coil 73 which operates when energized to actuate the switching means from a normally open circuit or disconnecting position to a closed or circuit connecting position, a latch member 74 which holds the switching means in its closed position, an opening coil 75 which operates when energized to release latch member 74 thereby to permit actuation of the switching means to its normal open circuit position, and four position indicating contacts 76, 77, 78 and 79. Contact 77 is closed only while switching means 32 is in its open circuit position thereby providing a signal indication that the auxiliary switching means is open. Contact 76, 78 and 79 are closed only when the auxiliary switching means is closed.

As indicated in Fig. 2 by following broken line e, the main switching means 13 of Fig. 1 is provided with an operating coil 80 which operates when energized to actuate the switching means from a normally open circuit or disconnecting position to a closed or circuit connecting position, a latch member 81 which holds the switching means in its closed position, a solenoid 82 which operates when energized to release latch member 81 thereby to permit deactuation of the switching means to its normal open circuit position, and seven position indicating contacts 83–89. Contacts 85, 86, and 89 are closed only when main switching means 13 is in its open circuit position, while contacts 83, 84, 87 and 88 are closed only when the main switching means is closed.

As indicated in Fig. 2 by following broken line f, the circuit interrupting means 12 of Fig. 1 is provided with an operating coil 90 operable when energized to close the circuit interrupting means, a latch member 91 disposed to hold the circuit interrupter in its closed position, a tripping coil 92 which operates when energized to release latch member 91 thereby to permit movement of the circuit interrupter to its normal circuit interrupting position, and four position indicating contacts 93, 94, 95, and 96. Contact 95 is closed only when circuit interrupter 12 is in its circuit interrupting position, while contacts 93, 94 and 96 are closed only when the circuit interrupting means is closed.

As can be seen in Fig. 2, operating coil 90 of circuit interrupter 12 is connected for energization from battery 52 by means of a circuit including a manually operable push button switch 98, the normally closed contact 69 of auxiliary relay 68, and a contact 99 of a control relay 100. Thus, closing operation of circuit interrupter 12 can be initiated by operation of push button switch 98 if auxiliary relay 68 has not been energized and if contact 99 is closed. Contact 99 is arranged to be closed whenever the control relay 100 is picked up due to its operating coil 101 being energized. The energization of operating coil 101 is controlled by a limit switch 102 in accordance with the position of the contact dwell adjusting means.

The limit switch 102 is operable to connect operating coil 101 for energization from battery 52 only when the contact dwell is zero, as will be explained in detail below. Fig. 2 illustrates control relay 100 in this energized, picked up condition, wherein contact 99 will permit circuit interrupter 12 to be closed. Control relay 100 also is provided with a normally closed contact 103 and with two other normally open contacts 104, and 105. Contact 103 is located in Fig. 1, as indicated by broken line b, and this contact is connected in series circuit relation with contact 44 of voltage relay 41. The series combination of contacts 103 and 44 is connected across contact 35 of excitation relay 34 thereby to insure that contactor 24 remains closed and synchronous motor 23 continues operating at synchronous speed as long as the limit switch 102 is open which indicates that the contact dwell of the switch contacts C1–C6 may be other than zero.

In the illustrated embodiment of the invention, limit switch 102 and three companion limit switches 106, 107 and 108 are operated by a single camming disc 109 keyed to the shaft h of the actuating means which operates to rotate pinion 22 of the contact dwell adjusting means shown in Fig. 1. The actuating means may comprise, for example, a direct current motor 110 coupled to shaft h and having series windings 110R and 110L. Actuating motor 110 is selectably operable in either a clockwise or a counterclockwise direction depending upon whether field winding 110R or 110L is connected for energization from the source of substantially constant electric energy 52. Counterclockwise rotation operates the rack and pinion mechanism 21, 22 in a manner to lower the wedges 20 thereby decreasing the dwell of the switch contacts C1–C6. As shown in Figs. 1 and 2, camming disc 109 is arranged to close limit switch 102 and to open limit switch 106 when shaft h during its counterclockwise movement reaches an angular position which corresponds to the zero dwell position of the switch contacts. When limit switch 106 opens, field winding 110L is deenergized thereby preventing further lowering of the wedges. Motor 110 can rotate clockwise thereby raising the wedges 20 and increasing the dwell of the switch contacts C1–C6 until shaft h reaches a position which corresponds to normal contact dwell. In this extreme clockwise position, camming disc 109 will close limit switch 107 and open limit switch 108. The opening of limit switch 108 deenergizes field winding 110R to prevent further raising of the wedges.

As can be seen in Fig. 2, field winding 110R is connected for energization by a control circuit including starting switch contact 62, control relay contact 47, position indicating contacts 86, 77 and 94 of the main and auxiliary switching means 13 and 32 and of circuit interrupting means 12 respectively, time element contact 54, and limit switch 108. When actuating motor 110 has rotated clockwise to increase contact dwell to normal, limit switch 108 is opened by camming disc 109 to deenergize winding 110R and stop motor 110. At the same time, camming disc 109 closes limit switch 107 to connect the operating coil 111 of another control relay 112 to battery 52. A normally open contact 113 of control relay 112 is used in conjunction with position indicating contacts 85 and 93 of the main switching means 13 and circuit interrupter 12 respectively to conect closing coil 73 of auxiliary switching means 32 to battery 52. Closing coil 73 responds to the resulting energization and actuates the auxiliary switching means to its closed circuit position.

A manually operable push button 115 is used to connect operating coil 80 of main switching means 13 to battery 52 through position indicating contact 78 of the auxiliary switching means 32. The main switching means is thus actuated to its closed circuit position wherein phase circuits 1–6 of the mechanical rectifier are coupled through switch contacts C1–C6 to the load circuit.

Suitable means is employed for detecting the flow of rectified current in the load circuit. Such means may comprise, for example, a current responsive relay 118 having an operating coil 117 which is connected to a suitable shunt 116 disposed in the positive D. C. lead. Relay 118 is actuated whenever coil 116 is energized by current corresponding to load curent flowing in the D. C. leads. Relay 118 is provided with a normally open contact 119 which is indicated by broken line $d$ in Fig. 2. The opening coil 75 of auxiliary switching means 32 is connected for energization from battery 52 by a circuit including contact 119 and position indicating contacts 83 and 76 of the main and auxiliary switching means respectively.

A manually controlled stopping switch 120 is provided to control stopping of the mechanical rectifier. This switch, which is normally in a running position, is actuated to a stopping position in response to the energization of its operating coil 121. As can be seen in Fig. 2, a manually operable push button switch 122 is used to connect operating coil 121 for energization from battery 52. Stopping switch 120 has three normally closed contacts 123, 124 and 125 and six normally open contacts 126–131. Contact 126 is connected in series circuit relation with a normally closed contact 132 of a main switching means position responsive time delay relay 133. The operating coil 134 of relay 133 is energized whenever contact 88 is closed to indicate that the main switching means 13 is in its closed circuit position. Suitable time delay means, such as a dashpot 135, is provided to delay the dropout operation of the relay 133 whenever operating coil 134 is deenergized in response to deactuation of the main switching means to its open circuit position. The series combination of contacts 132 and 126 is connected for supplying energization to the opening coil 75 of auxiliary switching means 32.

Other contacts of stopping switch 120 are connected as follows: Contact 123 is connected in series with push button switch 50 which is used to connect time element means 51 for energization; contact 124 is connected in series with the operating coil 90 of the circuit interrupting means 12; contact 129 is connected in series combination with starting switch contact 64, and this combination is connected across push button switch 122 thereby to hold the stopping switch operating coil 121 energized as long as starting switch 58 is in its starting position; contact 130 is connected in series with tripping coil 92 of the circuit interrupter 12; and contact 131 is connected in series combination with contact 105 of control relay 100 and with position indicating contact 89 of main switching means 13, this combination being connected in parallel with contact 70 of auxiliary relay 78 thereby to supply energization to solenoid 71 of the starting switch 58.

Contacts 125 and 127 of the stopping switch provide the means by which the direction of operation of actuating motor 110 is selected. With stopping switch 120 in its running position, contact 125 is closed to permit energization of field winding 110R through limit switch 108, whereby motor 110 can operate in its clockwise direction to increase the dwell of switch contacts C1–C6. But with stopping switch 120 in its stopping position, contact 127 is closed to provide for energization of field winding 110L through limit switch 106, whereby motor 110 can operate in its counterclockwise direction to decrease contact dwell. Thus, stopping switch 120 serves as a selector switch for determining the direction in which contact dwell is to be changed. Position indicating contact 95 of circuit interrupter 12 is connected in parallel with contact 127 to insure that the wedges 20 have been fully lowered, in which position limit switch 102 is closed thereby permitting circuit interrupter 12 to be closed during the starting operation.

Finally, contact 128 of the stopping switch 120 is used to connect the operating coil 136 of an auxiliary stopping switch 137 to battery 52. When contact 128 closes, operating coil 136 is energized to actuate switch 137 from a normal running to a stopping position. Another manually operable push button switch 138 is connected across contact 128 whereby auxiliary stopping switch 137 can be actuated to its stopping position by operation of this push button switch 138. The auxiliary stopping switch is provided with three normally closed contacts 139, 140 and 141, with two normally closed contacts 142 and 143, and with a time delay means such as the illustrated dashpot 144 which delays only deactuation of the switch to its running position upon deenergization of coil 136. Contact 139 is connected in series with the current responsive relay contact 119 and with position indicating contact 83 of main switching means 13 in the circuit employed to supply energization to the opening coil 75 of auxiliary switching means 32. Contact 140 is connected in series with position indicating contact 85 of main switching means 13 in the circuit which supplies energization to the closing coil 73 of auxiliary switching means 32. Contact 142 is connected in series combination with main switching means position indicating contact 84, and the combination is connected across the aforesaid series connected contacts 85 and 140. Contact 141 is connected in series with the operating coil 80 of main switching means 13, while contact 143 is connected in series with the solenoid 182 of the main switching means.

From the foregoing detailed description of the components and circuits of the control system for starting the illustrated mechanical rectifier, the manner in which the control system operates may now be readily followed. While the mechanical rectifier is at rest before starting, all of the equipment will be in the positions that have been shown in the drawings. The starting sequence is initiated by manual operation of push button switch 50. As a result, time element means 51 is energized and picks up immediately to close contact 53 which connects the operating coil 57 of starting switch 58 for energization. Consequently, starting switch 58 is actuated to its starting position wherein it is held by latch 59. Contact 61 opens to deenergize time element means 51 which will not operate in response thereto until the predetermined time interval has elapsed. Contact 60 of starting switch 58 closes to cause operation of contactor 27 thereby supplying energization to the commutating reactor control windings D1–D6. Excitation relays 34 responds to this energization by closing contact 35 which causes operation by contactor 24 thereby coupling the armature circuit of synchronous motor 23 to input terminals T1, T2 and T3.

Synchronous motor 23 will draw sufficient inrush current to actuate current relay 38, and the resulting closure of contact 39 connects voltage relay 42 for energization from the armature circuit of synchronous motor 23.

When motor 23 attains synchronous operation, current relay 38 is deactuated since armature current has now decayed to normal running value. As a result contact 40 will close, and since contact 43 of voltage relay 41 is now closed, control relay 45 will be actuated. Control relay 45 operates to open its contact 48 thereby disabling auxiliary relay 68. If synchronous motor 23 has not attained synchronous operation before the predetermined time interval of time element means 51 has elapsed, contact 55 of the time element means will have closed before contact 48 of control relay 45 is opened thereby energizing auxiliary relay 68 which closes its contact 70 to energize solenoid 71 and deactuate starting switch 58. Under this circumstance, the starting sequence could proceed no further, and a a result of starting switch contact 60 opening, the commutating reactor control windings would be deenergized and synchronous motor 23 would be disconnected from the control power.

The second manual step in the closing procedure is operation of push button switch 98. Since contact dwell is presently zero, control relay 100 is energized through limit switch 102, and contact 99 is closed. As long as the first step of the starting sequence has proceeded normally, contact 69 of auxiliary relay 68 has remained closed. Therefore, closure of push button switch 98 energizes operating coil 90 of circuit interrupting means 12 which operates to close the supply lines L1, L2 and L3 thereby energizing the power transformer 11. It should be noted that it is possible to close circuit interrupter 12 by operating push button switch 98, if desired, before starting switch 58 is actuated to its starting position in response to the manual operation of push button switch 50. As soon as circuit interrupter 12 is closed, as indicated by the closure of position indicating contact 94, and motor 23 is running at synchronous speed, as indicated by the actuation of control relay 45 and the accompanying closure of contact 47, the actuating motor 110 operates to change contact dwell. For this operation to take place, starting switch 58 must be in its starting position, as indicated by contact 62 being closed, and the main and auxiliary switching means must be in their open circuit positions as indicated respectively by contacts 86 and 77 being closed. Also, contact 54 of time element means 51 must be closed which indicates that the predetermined time interval has elapsed since actuating the starting switch 58, thus assuring that motor 23 has had ample opportunity to become stabilized at synchronous speed. Since stopping switch 120 is in its running position, contact 125 is closed to select field winding 110R for energization through limit switch 108. Actuating motor 110 therefore operates in the clockwise direction to raise the wedges 20 and increase the dwell of switch contacts C1–C6. When normal contact dwell has been reached, limit switch 107 closes to energize control relay 112 thus closing contact 113. Since circuit interrupting means 12 is now closed and the main switching means 13 is now in its open circuit position, as indicated respectively by contacts 93 and 85 being closed, and since contact 140 is closed due to auxiliary stopping switch 137 being in its normal running position, closure of contact 113 supplies energization to closing coil 73 which operates to actuate auxiliary switching means 32 to its closed circuit position. As a result, the phase circuits 1–6 are connected through switch contacts C1–C6 to the predetermined light load impedance 31, and sufficient load current flows to properly magnetize interphase transformer IT.

With the auxiliary switching means 32 in its closed circuit position as indicated by contact 78 being closed, and with contact 141 of the auxiliary stopping switch closed, operating coil 80 can be energized to actuate main switching means 13 to its closed circuit position by manually closing push button switch 115. This operation connects the load circuit to the supply circuits comprising supply lines L1–L3 and phase circuits 1–6 of the mechanical rectifier, and assuming that there is sufficient load, rectified current will begin to flow in the load circuit. Current responsive relay 118, which is energized by the flow of rectified current in the positive D. C. lead, actuates to close its contact 119. Since main switching means 13 is now in its closed circuit position as indicated by contact 83 being closed, and auxiliary stopping switch 137 is in its running position as indicated by contact 139 being closed, closure of contact 119 will energize opening coil 75 which operates to actuate the auxiliary switching means 32 to its open circuit position thereby disconnecting the predetermined impedance 31. At this point the starting sequence is complete and normal operating conditions exist in the mechanical rectifier apparatus.

The main switching means 13 can be deactuated to its open circuit position thereby disconnecting the load circuit from the mechanical rectifier by manual operation of push button switch 138. Switch 138 connects the operating coil 136 of auxiliary stopping switch 137 for energization, and as a result switch 137 is actuated immediately to its stopping position. The time delay means 144 causes switch 137 to remain in its stopping position, even if push button switch 138 were released to deenergize coil 136, for a sufficient interval of time to permit completion of the following two events. Contact 142 closes to complete a circuit, including contact 84 which is closed since main switching means 13 is now in its closed circuit position, for energizing the closing coil 73 of auxiliary switching means 32. Contact 79 closes when the auxiliary switching means has been actuated to its closed circuit position, and since contact 143 of auxiliary stopping switch 137 is now closed, solenoid 82 is energized thereby deactuating the main switching means 13. It is necessary to connect the predetermined impedance 31 to the mechanical rectifier by closing auxiliary switching means 32 whenever the load circuit is disconnected by deactuating the main switching means in order that sufficient load current will flow to permit sparkless operation as discussed hereinbefore.

Manual operation of push button switch 122 will initiate a sequence of events to automatically shutdown the mechanical rectifier. In general, the stopping sequence comprises the starting sequence in reverse. By closing the push button switch 122, stopping switch 120 is actuated from its running to its stopping position. Closure of contact 128 causes auxiliary stopping switch 137 also to be actuated from running to stopping position. The auxiliary switching means 32 will then be actuated to its closed circuit position followed by deactuation of main switching means 13 as described in the foregoing paragraph. Auxiliary switching means 32 must remain in its closed circuit position to connect the predetermined impedance 31 for a sufficient interval of time to permit both poles 13a and 13b of the main switching means to open completely, thus avoiding harmful transient conditions caused by failure of these two poles to interrupt the load current exactly simultaneously. With main switching means 13 in its open circuit position, contact 88 is open to deenergize the previously energized coil 134 of time delay relay 133. Relay 133 will drop out after the above mentioned interval of time to close contact 132 thereby completing a circuit, including contact 126 which is closed since stopping switch 120 is now in its stopping position, for energizing opening coil 175 to actuate the auxiliary switching means 32 to its open circuit position thereby disconnecting the predetermined impedance 31. Now the contact dwell can be reduced from normal to zero.

Since the starting switch 58 is in its starting position, and motor 23 is running at synchronous speed, as indicated respectively by contacts 62 and 47 being closed, as soon as the main and auxiliary switching means are in their open circuit positions as indicated respectively by contacts 86 and 77 being closed, the actuating motor 110 operates to change contact dwell. Since the stopping switch 120 is in its stopping position, contact 127 is closed to select field winding 110L for energization through limit switch 106. Actuating motor 110 therefore operates in the counterclockwise direction to lower the wedges 20 and decrease the dwell of the switch contacts C1-C6. When zero contact dwell is reached, limit switch 102 closes to energize control relay 100 thus closing contacts 104 and 105. Contact 104 in series with the presently closed contact 130 of stopping switch 120 causes tripping coil 92 to be energized thereby deactuating circuit interrupting means 12 which opens to deenergize transformer 11 and the mechanical rectifier phase circuits 1-6. Contact 105 in series with the presently closed contact 131 of stopping switch 120 and the position indicating contact 89 of main switching means 13 supplies energization to solenoid 71 which operates to deactuate starting switch 58 to its off position. As a result, contact 60 opens to deenergize contactor 27 which deenergizes the commutating reactor control windings D1-D6, and excitation relay 33 is deenergized to open contact 35 thereby deenergizing contactor 24 (contact 103 of control relay 100 having been opened when limit switch 102 closed in response to zero contact dwell). Contactor 24 operates to disconnect the armature circuit of synchronous motor 23 from the input terminals T1, T2 and T3 whereby motor 23 will stop. The mechanical rectifier is now shut-down or stopped.

When starting switch 58 is actuated to its off position, contact 64 opens to deenergize the operating coil 121 of the stopping switch 120 thereby deactuating switch 120 to its running position in readiness for the next starting operation. Prior to this time, contacts 123 and 124 have been open to prevent actuation of starting switch 58 to its starting position upon operation of push button switch 50 and to prevent the closure of circuit interrupting means 12 upon operation of push button switch 98.

While a preferred form of our invention has been shown and described by way of illustration, many modifications will occur to those skilled in the art. We contemplate, therefore, that the appended claims should cover all such modifications as fall within the true spirit and scope of the invention.

What we claim as new and desire to secure by letters patents of the United States is:

1. In electric curent rectifying apparatus, a supply circuit having input terminals adapted to be connected to a source of alternating current and including a cyclically operable circuit opening and closing contact, a contact operating mechanism, a synchronous motor connected to actuate said mechanism and including an armature circuit, switching means to connect said armature circuit to said terminals, a voltage relay, a current relay connected in said armature circuit and actuated in response to armature inrush current to connect said voltage relay for energization from said armature circuit, said current relay being deactuated upon decay of armature current to a normal running value, means for retaining said voltage relay energized from said armature circuit independent of said current relay, and control means actuable in response to deactuation of said current relay while said voltage relay is energized, whereby said control means is actuated when said motor attains normal running speed in starting operation.

2. In electric current rectifying apparatus, a supply circuit having input terminals adapted to be connected to a source of alternating current and including a cyclically operable circuit opening and closing contact, a contact operating mechanism, a synchronous motor connected to actuate said mechanism and including an armature circuit, a saturable commutating reactor having a main winding connected in said supply circuit and including a control winding, a manually controlled starting switch connected to supply energization to said control winding, means responsive to the energization of said control winding to couple said armature circuit to said terminals, a current relay connected in said armature circuit for actuation in response to armature inrush current, said current relay being deactuated upon decay of armature current to a normal running value, a voltage relay adapted to be connected for energization to said armature circuit in response to the actuation of said current relay, said voltage relay including means responsive to the energization of said voltage relay to retain a connection to said armature circuit independent of said current relay, and control means actuable in response to deactuation of said current relay while said voltage relay is energized, whereby said control means is actuated when said motor attains normal running speed in starting operation.

3. In electric current rectifying apparatus, a supply circuit having input terminals adapted to be connected to a source of alternating current and including a cyclically operable circuit opening and closing contact, a contact operating mechanism, a synchronous motor connected to actuate said mechanism, a manually controlled starting switch having a normal off postion and actuable to a starting position for coupling said motor to said terminals, time element means operable upon actuation of said starting switch to deactuate said starting switch to said off position after a time interval, and means responsive to synchronous operation of said motor for disabling said time element means.

4. In electric current rectifying apparatus, a supply circuit having input terminals adapted to be connected to a source of alternating current and including a cyclically operable circuit opening and closing contact, a contact operating mechanism, a synchronous motor connected to actuate said mechanism, a saturable commutating reactor having a main winding connected in said supply circuit and having a control winding, a manually controlled starting switch having a normal off position and actuable to a starting position to supply energy to said control winding, time element means operable upon actuation of said starting switch to deactuate said starting switch to said off position after a time interval, means operable in response to energization of said control winding to couple said motor for energization to said terminals, and means responsive to synchronous operation of said motor for disabling said time element means.

5. In an apparatus for supplying rectified alternating current to a direct current load circuit, a supply circuit having input terminals adapted to be connected to a source of alternating current and having a cyclically operable circuit opening and closing contact, a mechanism connected to operate said contact in synchronism with the alternating current and including means actuable to adjust the contact dwell between zero and normal, actuating means selectably operable in either of two directions for actuating said contact dwell adjusting means to change said contact dwell either from zero to normal or from normal to zero, a selector switch connected to select the direction of operation of said actuating means, main switching means having open and closed circuit positions for coupling said load circuit to said supply circuit, a predetermined impedance, auxiliary switching means actuable between open and closed circuit positions for coupling said impedance to said supply circuit, means responsive to the positions of said main and auxiliary switching means for disabling said actuating means when either one of said switching means is in closed circuit position, and means operable while said main switching means is in its open circuit position for actuating said auxiliary switching means to its closed circuit position when said contact dwell is normal.

6. In an apparatus for supplying rectified alternating current to a direct current load circuit, a pair of supply circuits each having input terminals adapted to be connected to a source of alternating current and each having a cyclically operable circuit opening and closing contact, a mechanism connected to operate the contacts in synchronism with the alternating current and including means actuable to adjust the dwell of the contacts, actuating means selectably operable in either of two directions for actuating said contact dwell adjusting means to increase or to decrease the dwell of the contacts between zero and normal, a selector switch connected to select the direction of operation of said actuating means, main switching means for connecting each of said supply circuits to said load circuit, a predetermined impedance, auxiliary switching means actuable to connect each of said supply circuits to said predetermined impedance, each of said switching means including means for disabling said actuating means whenever the switching means is in a circuit connecting position, and means operable when said main switching means is in its disconnecting position for actuating said auxiliary switching means when the dwell of the contacts is normal.

7. In an apparatus for supplying rectified alternating current to a direct current load circuit, a supply circuit including current rectifying means, main switching means actuable to connect said supply circuit to said load circuit, a predetermined impedance, auxiliary switching means having a disconnecting position and actuable to connect said predetermined impedance to said supply circuit, means operable upon actuation of said auxiliary switching means to actuate said main switching means, relay means actuable in response to the flow of rectified current in said load circuit, and means operable upon actuation of both said relay means and said main switching means to actuate said auxiliary switching means to its disconnecting position thereby to disconnect said predetermined impedance from said supply circuit.

8. In an apparatus for supplying rectified alternating current to a direct current load circuit, a supply circuit having input terminals adapted to be connected to a source of alternating current and having a circuit opening and closing contact, a mechanism connected to cyclically operate said contact and including means actuable for adjusting the contact dwell between zero and normal, a synchronous motor connected to actuate said mechanism and including an armature circuit, a limit switch connected to indicate whether said contact dwell is zero or normal, circuit interrupting means connected in said supply circuit between said terminals and said contact and operable to close said supply circuit when said limit switch indicates that said contact dwell is zero, a saturable commutating reactor having a main winding connected in series in said supply circuit and having a control winding, a manually controlled starting switch having a normal off position and actuable to a starting position to supply energization to said control winding, means responsive to the energization of said control winding to couple said armature circuit to said terminals, relay means actuable in response to synchronous operation of said motor, a manually controlled stopping switch having a normal running position and actuable to a stopping position, main switching means having a normal open circuit position and actuable to a closed circuit position to connect said supply circuit to the load circuit, a predetermined impedance, auxiliary switching means actuable between open and closed circuit positions for coupling said supply circuit to said predetermined impedance, actuating means operable in response to the closure of said circuit interrupting means and to the actuation of said relay means for actuating said contact dwell adjusting means to change said contact dwell from zero to normal whenever said stopping switch is in its running position and both of said switching means are in open circuit positions, closing means operable in response to an indication by said limit switch that said contact dwell is normal for actuating said auxiliary switching means to its closed circuit position whenever said stopping switch is in its running position while said main switching means is in its open circuit position, means operable to actuate said main switching means while said auxiliary circuit breaker is in its closed circuit position, current responsive relay means energized by the flow of rectified current in the load circuit, opening means operable upon the actuation of said main switching means and the energization of said current responsive relay means for actuating said auxiliary switching means to its open circuit position whenever said stopping switch is in its running position, said closing means being operable to actuate said auxiliary switching means upon actuation of said stopping switch while said main switching means is in its closed circuit position, means responsive to actuation of said auxiliary switching means to its closed circuit position to deactuate said main switching means when ever said stopping switch is in its stopping position, said opening means being operable to actuate said auxiliary switching means upon deactuation of said main switching means while said stopping switch is in its stopping position, said actuating means being operable with both of said switching means in open circuit positions and with said relay means actuated while said stopping switch is in its stopping position to actuate said contact dwell adjusting means to change said contact dwell from normal to zero, means operable in response to an indication by said limit switch that said contact dwell is zero for deactuating said starting switch whenever said stopping switch is in its stopping position, and means responsive to the deactuation of said starting switch to deactuate said stopping relay.

9. In a single-way mechanical rectifier, electric power transforming means having a plurality of primary windings connected to alternating current supply lines and having six secondary windings arranged in two Y-connected sets to provide a six-phase alternating current source, an interphase transformer interconnecting the neutral points of said two sets of secondary windings, six phase circuits each connected to one of said secondary windings and each including a cyclically operable contact disposed periodically to open and close the circuit, a mechanism connected to operate the contacts in synchronism with the alternating current, and means responsive to actuation of the mechanism for electrically connecting the three phase circuits associated with one of said sets of secondary windings to the three phase circuits associated with the other set of secondary windings only when said mechanism is operating the contacts at synchronous speed.

References Cited in the file of this patent

UNITED STATES PATENTS

| 1,565,546 | Burke | Dec. 15, 1925 |
| 2,193,421 | Janetschke | Mar. 12, 1940 |
| 2,261,685 | Jordan | Nov. 4, 1941 |
| 2,276,784 | Koppelmann | Mar. 17, 1942 |
| 2,288,016 | Myers | June 30, 1942 |
| 2,340,098 | Zuhlke | Jan. 25, 1944 |
| 2,797,381 | Schmidt | June 25, 1957 |
| 2,811,687 | Diebold | Oct. 29, 1957 |